(12) United States Patent
Usami

(10) Patent No.: US 12,011,870 B2
(45) Date of Patent: Jun. 18, 2024

(54) APPARATUS AND METHOD FOR MANUFACTURING A SURFACE-LAYERED PART

(71) Applicant: TOYODA IRON WORKS CO., LTD., Toyota (JP)

(72) Inventor: Toru Usami, Toyota (JP)

(73) Assignee: TOYODA IRON WORKS CO., LTD., Toyota (JP)

(*) Notice: Subject to any disclaimer, the term of this patent is extended or adjusted under 35 U.S.C. 154(b) by 204 days.

(21) Appl. No.: 17/440,667

(22) PCT Filed: Sep. 17, 2020

(86) PCT No.: PCT/JP2020/035215
§ 371 (c)(1),
(2) Date: Sep. 17, 2021

(87) PCT Pub. No.: WO2021/140707
PCT Pub. Date: Jul. 15, 2021

(65) Prior Publication Data
US 2022/0152913 A1 May 19, 2022

(30) Foreign Application Priority Data
Jan. 7, 2020 (JP) .................. 2020-000921

(51) Int. Cl.
*B29C 63/00* (2006.01)
*B29C 53/00* (2006.01)
(Continued)

(52) U.S. Cl.
CPC .......... *B29C 63/22* (2013.01); *B29C 63/0004* (2013.01); *B29C 63/0073* (2013.01)

(58) Field of Classification Search
CPC . B29C 63/22; B29C 63/0004; B29C 63/0073; B29C 53/80; B60N 2/646; B60N 2/643; B60N 2/7017
See application file for complete search history.

(56) References Cited

U.S. PATENT DOCUMENTS 3,580,770 A  5/1971  Dyal
5,324,384 A  6/1994  Spengler
(Continued)

FOREIGN PATENT DOCUMENTS

DE  10 2018 201 850 A1  8/2019
EP  0 603 498 A1  6/1994
(Continued)

OTHER PUBLICATIONS

JPH06344442 (Araki) Dec. 1994 (online machine translation), [Retrieved on Apr. 14, 2023]. Retrieved from: Espacenet (Year: 1994).*

(Continued)

*Primary Examiner* — Seyed Masoud Malekzadeh
*Assistant Examiner* — Andres E. Behrens, Jr.
(74) *Attorney, Agent, or Firm* — Oliff PLC

(57) ABSTRACT

An apparatus for manufacturing a surface-layered part comprises: a main support that supports a surface layer member to be placed under a base member; a pulling device arranged at a periphery of the main support, wherein the pulling device includes a pulling member that pulls an edge of the surface layer member, which is in a position away from the edge of the base member, outward with respect to the base member; a base member clamping device that fixedly clamps the surface layer member, having been pulled outward by the pulling member of the pulling device, against the main support via the base member placed over the surface layer member; and a relieving device that separates (Continued)

the pulling member from the edge of the surface layer member, which has been moved outward with respect to the base member by the pulling device, to allow the edge of the surface layer member to wrap around the edge of the base member by an elastic restoring force of the surface layer member, thereby integrating them; and a control device that drives and controls the base member clamping device, the pulling device, and the relieving device.

6 Claims, 9 Drawing Sheets

(51) Int. Cl.
- *B29C 53/04* (2006.01)
- *B29C 53/80* (2006.01)
- *B29C 63/04* (2006.01)
- *B29C 63/22* (2006.01)
- *B60N 2/00* (2006.01)
- *B60N 2/64* (2006.01)
- *B60N 2/70* (2006.01)

(56) References Cited

U.S. PATENT DOCUMENTS 8,371,838 B2 * 2/2013 Eberth ................... B32B 38/18
 264/293
2017/0327055 A1 11/2017 Onuma et al.

FOREIGN PATENT DOCUMENTS

| JP | H-06182871 A | * | 7/1994 | ............ B29C 63/04 |
| JP | H06-344442 A | | 12/1994 | |
| JP | H-06344442 | * | 12/1994 | ............ B29C 63/04 |
| JP | H06344442 A | * | 12/1994 | ............ B29C 63/04 |
| JP | H07-299868 A | | 11/1995 | |
| JP | 2002-248682 A | | 9/2002 | |
| JP | 2006-213134 A | | 8/2006 | |
| JP | 2016-107839 A | | 6/2016 | |
| JP | 2016107839 | * | 6/2016 | |
| JP | 2018-067244 A | | 4/2018 | |

OTHER PUBLICATIONS

JPH-06344442 (Araki) May 1994 (online machine translation), [Retrieved on Aug. 6, 2023]. Retrieved from: Espacenet (Year: 1994).*
JP-2016107839 (Onuma) Jun. 2016 (online machine translation), [Retrieved on Aug. 6, 2023]. Retrieved from: Espacenet (Year: 2016).*
JPH-06182871-A (Yamada) Jul. 1994 (online machine translation), [Retrieved on Jul. 19, 2023]. Retrieved from: Espacenet (Year: 1994).*
https://web.archive.org/web/20200101004838/https://en.wikipedia.org/wiki/Programmable_logic_controller (Year: 2020).*
Nov. 17, 2020 Office Action issued in Japanese Patent Application No. 2020-000921.
Apr. 7, 2021 Office Action issued in Japanese Patent Application No. 2020-000921.
Dec. 8, 2020 Search Report issued in International Patent Application No. PCT/JP2020/035215.
Oct. 20, 2022 Extended Supplementary Search Report Issued in European Patent Application No. 20913020.2.
Jul. 12, 2022 International Preliminary Report on Patentability issued in International Patent Application No. PCT/JP2020/035215.
Mar. 26, 2024 Office Action issued in U.S. Appl. No. 18/232,061.

* cited by examiner

APPARATUS AND METHOD FOR MANUFACTURING A SURFACE-LAYERED PART

CROSS-REFERENCE TO RELATED APPLICATIONS

The present application is a U.S. National Phase entry of, and claims priority to, PCT Application PCT/JP2020/035215, filed Sep. 17, 2020, which claims priority to Japanese Patent Application No. 2020-000921, filed Jan. 7, 2020, both of which are incorporated herein by reference in their entireties for all purposes.

TECHNICAL FIELD

The present disclosure relates to apparatuses and methods for manufacturing a surface-layered pan.

BACKGROUND

Various techniques associated with a surface-layered part that includes a base member and a surface layer member covering the surface of the base member have been proposed. For example, Japanese Patent Application Publication No. 2006-213134 discloses a vehicle armrest that includes a molded plastic armrest core and a cushion attached to the upper surface of the armrest core. The armrest core and the cushion are covered with a cover-shaped armrest skin, which has wrapping portions at its peripheral edge that are hooked on the edges of the armrest core.

SUMMARY

The vehicle armrest described in the above publication has the disadvantage that when attaching the armrest skin to the armrest core, workers are required to start with one corner of the armrest skin and hook all wrapping portions at the peripheral edge of the armrest skin onto the armrest core with their fingers. This results in a long time needed for the assembly. It is thus desired to improve the productivity by automating the work of wrapping the edge of the surface layer member around the edge of the base member.

The present disclosure provides, in an aspect, an apparatus for manufacturing a surface-layered part, comprising: a main support that supports a surface layer member placed under a base member; a pulling device arranged at a periphery of the main support, wherein the pulling device includes a pulling member that pulls an edge of the surface layer member, the edge of the surface layer member being in a position away from an edge of the base member nearest the edge of the surface layer member, outward with respect to the base member; a base member clamping device that fixedly clamps the surface layer member, after having been pulled outward by the pulling member of the pulling device, against the main support via the base member placed over the surface layer member; a relieving device that separates the pulling member from the edge of the surface layer member, the edge of the surface layer member having been moved outward with respect to the base member by the pulling device, to allow the edge of the surface layer member to wrap around the edge of the base member owing to an elastic restoring force of the surface layer member, thereby integrating the surface layer member and the base member; and a control device that drives and controls the base member clamping device, the pulling device, and the relieving device.

In some embodiments, the apparatus further comprises a peripheral support arranged along an edge of a lip of the main support, wherein the peripheral support serves as a bending restraint on the surface layer member as the surface layer member is being bent back outward over the peripheral support by the pulling member while being fixed, together with the base member, to the main support by the base member clamping device.

In some embodiments, the peripheral support comprises one or more round rail arranged along the edge of the lip of the main support.

In some embodiments, the base member clamping device pushes the base member into the main support so that a peripheral edge of the base member comes in close contact with the surface layer member to thereby clamp the surface layer member.

In some embodiments, the pulling member is shaped so as to hook the edge of the surface layer member and to be separated from the edge of the surface layer member.

The present disclosure provides, in another aspect, a method for manufacturing a surface-layered part using the apparatus described above, the method comprising: a first step of placing the surface layer member on the main support; a second step of pulling the edge of the surface layer member, which was placed in the first step, outward with respect to the base member by the pulling member; a third step of fixedly clamping the surface layer member, which has been pulled outward by the pulling member in the second step, against the main support by the base member clamping device via the base member placed over the surface layer member; and a fourth step of separating the pulling member from the edge of the surface layer member, which has been fixedly clamped against the main support via the base member in the third step, by the relieving device to allow the edge of the surface layer member to wrap around the edge of the base member owing to the elastic restoring force of the surface layer member, thereby integrating the surface layer member and the base member.

BRIEF DESCRIPTION OF THE DRAWINGS

FIG. 1 is an illustration of a method for manufacturing a surface-layered part.

DETAILED DESCRIPTION

Hereinafter, various embodiments of the present disclosure will be described in detail with reference to the drawings.

[Manufacturing Equipment]

First, the apparatus 1 for manufacturing a surface-layered part will be described with reference to FIGS. 1 to 7. In each figure, the side on which the worker stands is the front side of the manufacturing apparatus 1, and the directions of the manufacturing apparatus 1 are indicated by arrows, in the following description, directional terms will be used on the basis of the directions as shown.

Figure 1:
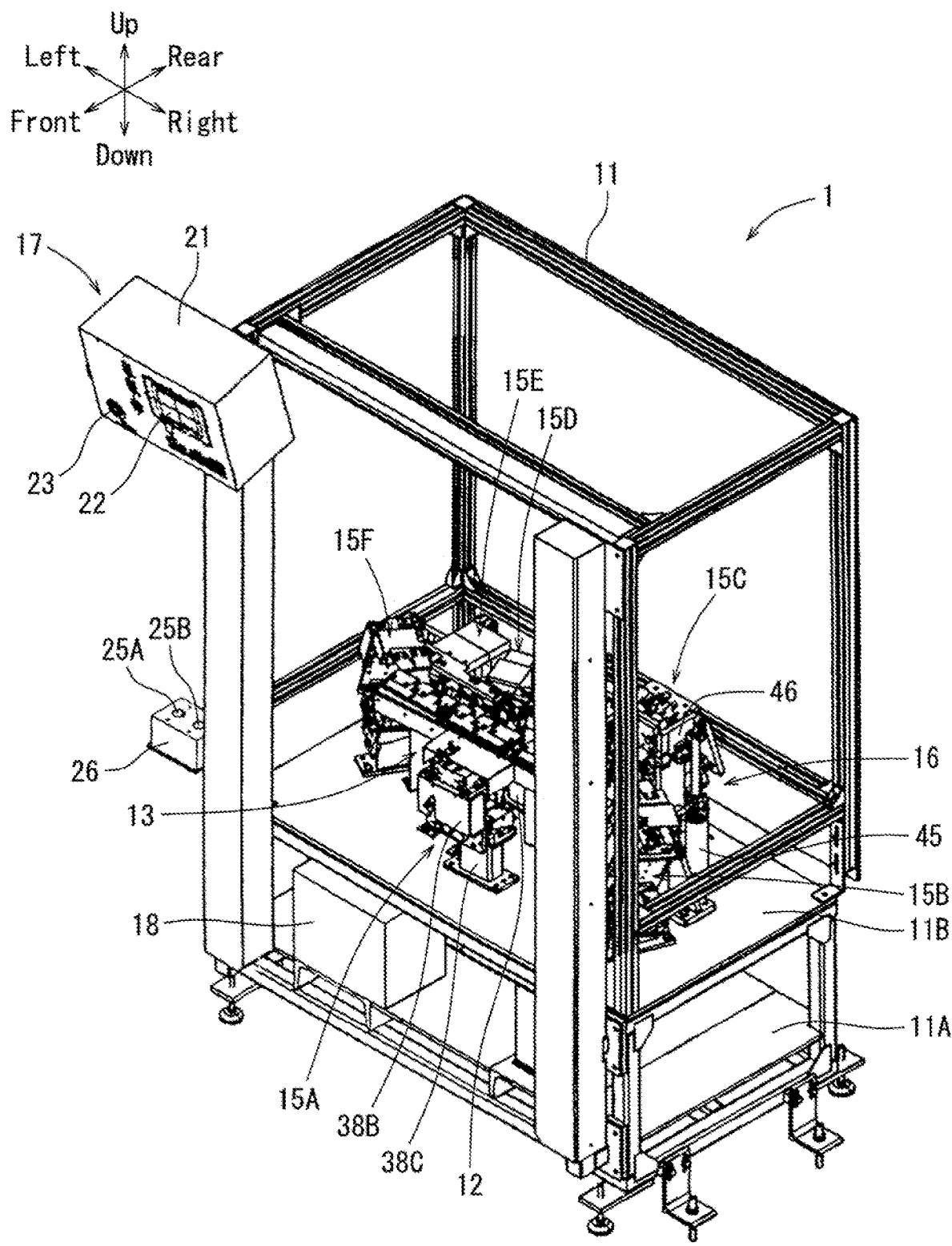
FIG. 1 is a perspective view of an exemplary apparatus for manufacturing a surface-layered part according to one embodiment.
Figure 2:
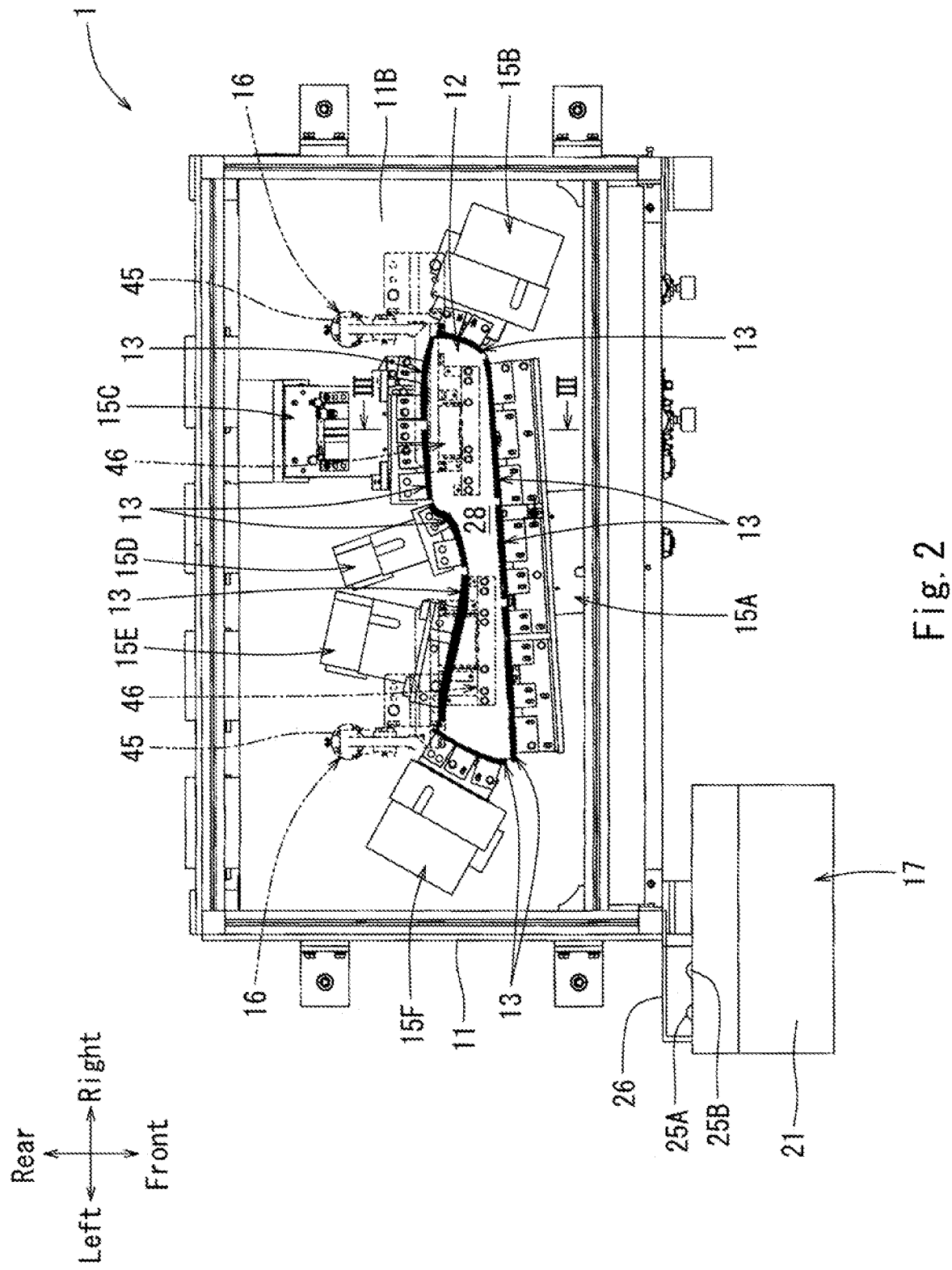
FIG. 2 is a plan view of the apparatus for manufacturing a surface-layered part of FIG. 1.
Figure 8:
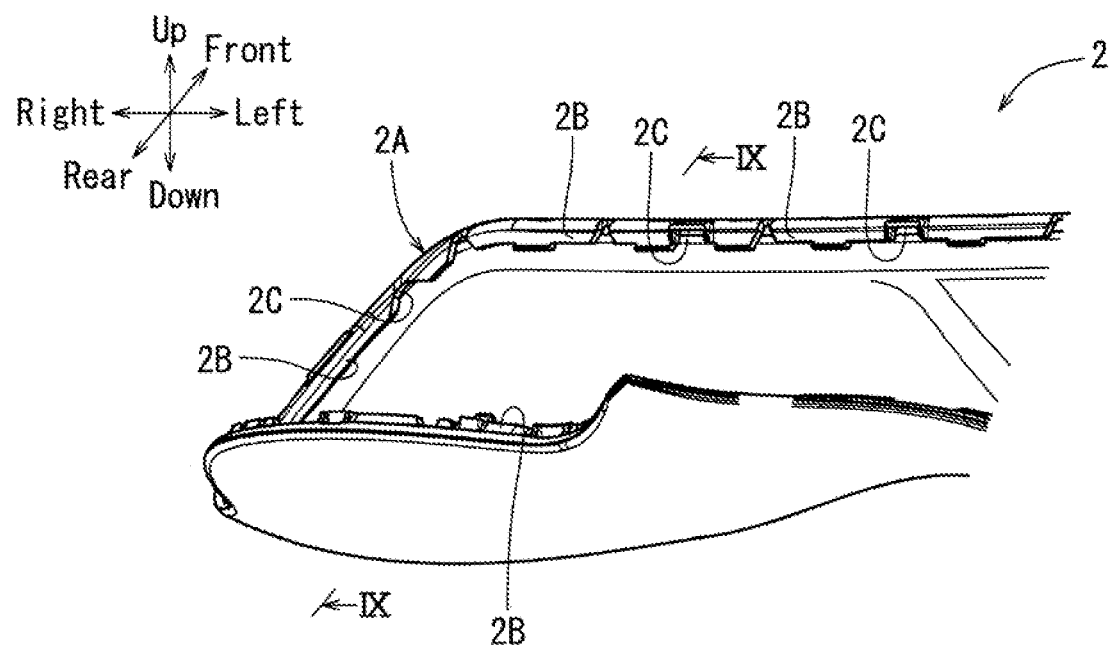
FIG. 8 is a perspective view of an example of a surface layer member.

As shown in FIGS. 1 and 2, the manufacturing apparatus 1 includes a frame 11 and a main support 12 for supporting a base member 3 and a surface layer member 2 (see, FIG. 8). The base member 3 and surface layer member 2 may be supported in such a way that the surface layer member 2 is layered on the lower side of the base member 3 (see, FIG. 10). The apparatus 1 further includes peripheral supports 13 arranged along the peripheral edge of a lip 12A (FIG. 3) of the main support 12. The apparatus 1 further includes pulling devices 15A-15F arranged around the main support 12 and configured to pull the edges 2A (FIG. 8) of the surface layer member 2 outward. The apparatus 1 further includes a pair of base member clamping devices 16 arranged at the left and right ends and on the rear side of the main support 12. The base member clamping devices 16 are configured to clamp the base member 3 layered on top of the surface layer member 2 by pushing the base member 3 into the main support 12. The apparatus 1 further includes a control device 17 configured to drive and control the pulling devices 15A-15F and the base member clamping devices 16.

In FIG. 1, the base member clamping device 16 on the left side is omitted. In FIG. 2, the base member clamping devices 16 that are pressing down the base member are indicated by two-dot-chain lines.

Referring to FIGS. 1 and 2, the frame 11 may be box shaped with a left to right king rectangular shape in a plan view. The frame 11 may be slightly higher than the height of a worker (e.g. about 180 cm high). A base plate 1A may be provided at the lower ends of the frame 11. A junction box 18 may be mounted on the base plate 11A for housing an air supply switching valve (not shown) or an electromagnetic relay (not shown) electrically connected to the control device 17. A flat mounting base plate 11B may be positioned above the junction box 18, for example at about the height of the worker's knee. The mounting base plate 11B may be for mounting equipment devices, such as the pulling devices 15A-15F, the main support 12, the peripheral supports 13, and the base member clamping devices 16, which may be secured by bolts or other means to the mounting base plate 11B.

The control device 17 includes a control circuit board, not shown, including: a CPU; a RAM, ROM, and/or EEPROM; an interface circuit; a timer; and so on, housed in a generally box-shaped housing 21 attached to the upper left front corner of the frame 11. A display 22 and operation buttons, such as a power button 23, electrically connected to the control circuit board may be provided on the front side of the housing 21. An operation box 26 with two operation buttons 25A, 25B for giving instructions, such as starting the operation, arranged on the upper surface may be attached to the front left member of the frame 11. It may be attached at a height slightly lower than the worker's waist. The operation buttons 25A, 25B are electrically connected to the interface circuit of the control device 17.

Figure 3:
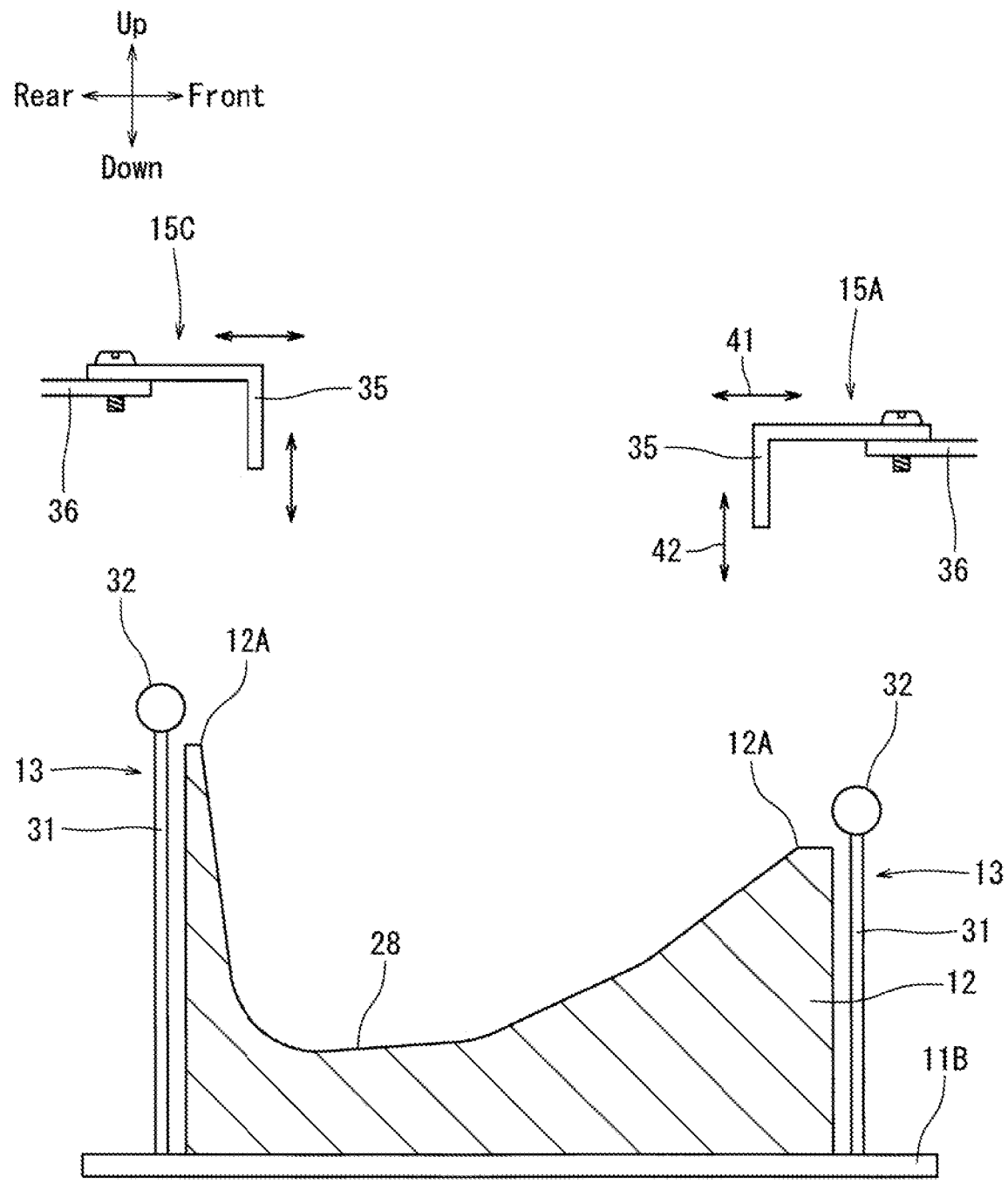
FIG. 3 is a cross-sectional view of the manufacturing apparatus of FIG. 2 taken along the line III-III of FIG. 2.

Referring to FIGS. 2 and 3, the main support 12 may be mounted on the mounting base plate 11B generally at the center in a position extending left to right. The bottom of the main support 12 may be fixed to the mounting base plate 11B with bolts or by any other means (not shown). The upper surface of the main support 12 is recessed downward to define a recess 28. The recess 28 may have a left to right long, generally rectangular shape in a plan view and a generally U-shaped cross section over its entire length. A surface layer member 2 is to be set on the recess 28 (see, FIG. 11), as will be further described later. The left to right long, generally rectangular shape in a plan view and the generally U-shaped cross section over the entire length of the recess 28 may be set, for example, in accordance with the shape of the outer surface of a surface-layered part. An example of the surface-layered part may be an armrest to be attached to the inner panel of the left door of an automobile, such that it is visible from inside of the vehicle. Accordingly, the recess 28 is open upward and has a left to right long, generally rectangular shape in a plan view. The surface layer member 2 can be set in the recess 28 from above.

Figure 4:
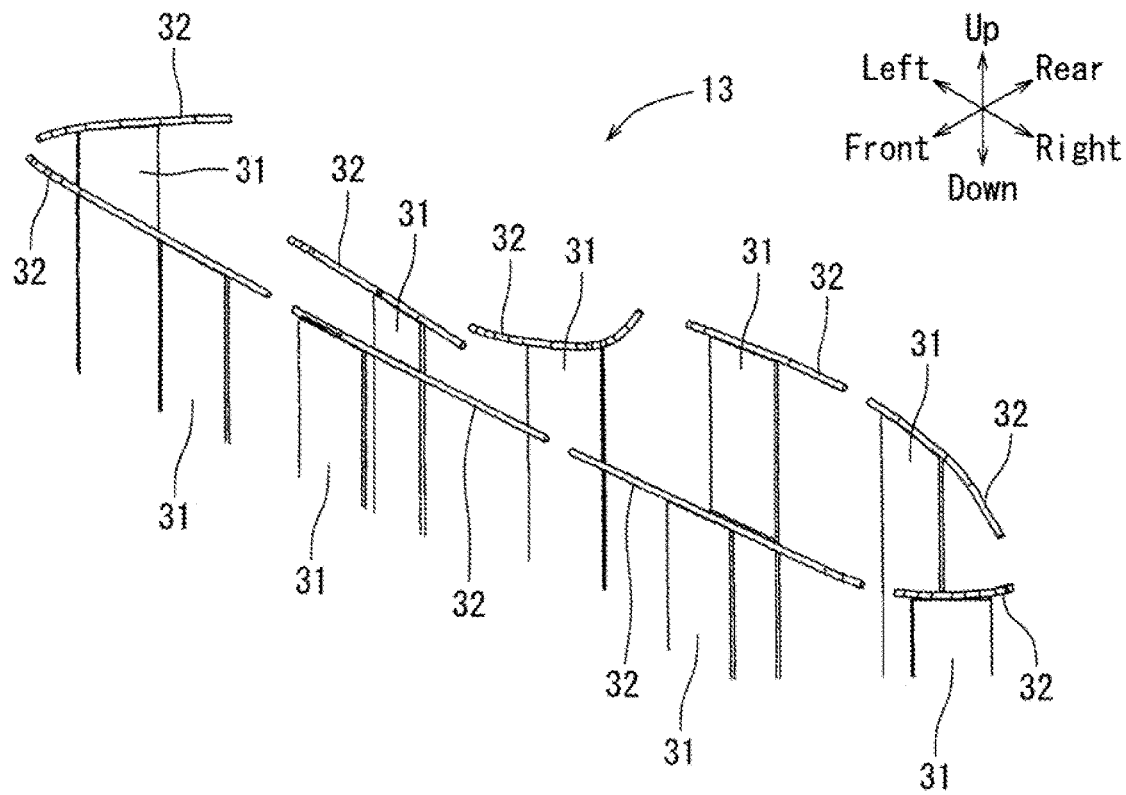
FIG. 4 is a perspective view of the peripheral support of FIG. 3.

Referring to FIGS. 3 and 4, each peripheral support 13 may include support plates 31 arranged along the periphery of the main support 12. The periphery of the main support 12 may have a left to right long, generally rectangular shape in a plan view. Each support plate 31 may have a vertically long rectangular shape in a front view. The peripheral support 13 further includes one or more round rail 32 welded or otherwise fixed in a substantially horizontal position along the upper end(s) of the respective support plates 31. The lower end of each support plate 31 is fixed to the mounting base plate 11B by bolting or the like, such that it extends substantially vertically. The support plate 31 is positioned at a height above the mounting base plate 11B substantially equal to or slightly higher than the lip 12A of the main support 12.

Each round rail 32 may be positioned slightly higher, for example by the diameter of the round rail 32, than the lip 12A of the main support 12 at the corresponding support plate 31. Each round rail 32 may have an appropriate length so that it traces the portion of the periphery of the lip 12A of the main support 12 that faces the corresponding support plate 31. Each round rail 32 may be appropriately curved along the periphery of the lip 12A. As a result, the round rails 32 serve as restraints on the peripheral edges 2A (FIG. 8) of the surface layer member 2 as the peripheral edges 2A are being bent back outwardly. The peripheral edges 2A may be bent as they are pulled outward while the base member 3 and the surface layer member 2 layered under it are clamped against the surface of the recess 28 (see, FIG. 11), as will be further described later.

Referring now to FIGS. 1 to 3 and 5, the general configuration of the pulling devices 15A-15F, which are arranged around the main support 12 and configured to pull the peripheral edges 2A (FIG. 8) of the surface layer member 2 outward, will be described. As shown in FIGS. 1 and 2, one pulling device 15A is positioned on the front side of the main support 12, substantially at the center in the left-to-right direction. Another pulling device 151 is positioned at the right end of the main support 12. Other pulling devices 15C, 15D. 15E are positioned along the rear side of the main support 12, left to right in this order. Still another pulling device 15F is positioned at the left end of the main support 12. The pulling devices 15A-15F may be fixed to the mounting base plate 11B by bolting or any other means.

As the pulling devices 15A-15F may be configured in substantially similar ways, the configuration of only one pulling device 15A will be described, with reference to FIGS. 3 and 5. As shown, the pulling device 15A includes a plurality of (e.g. nine) claws 35, each having a sideways L-shape in a side view. The claws 35 may be situated above the lip 12A of the main support 12. The pulling device 15A also includes a claw supporting member 36 for supporting the claws 35 along the corresponding portion of the lip 12A of the main support 12. The pulling device 15A further includes a generally box-shaped pulling mechanism 37 configured to move the claw supporting member 36 across the lip 12A of the main support 12. The pulling device 15A still further includes a vertical movement mechanism 38 configured to move the pulling mechanism 37 vertically.

The claws 35 may be formed from a sheet of a hard plastic or a metal, such as aluminum. Each edge of the claw 35 toward the main support 12 may have an L-shaped profile. The claws 35 may be bent downward so as to be able to hook (see, FIG. 11) a generally U-shaped wrapping portion 2B (FIG. 9) formed at the edge 2A (FIG. 8) of the surface layer member 2. The claws 35 may be arranged at intervals and screwed or otherwise fixed at their respective edges on the far side from the main support 12. They may be fixed to the upper surface of the long rectangular claw supporting member 36 at the edge that extends toward the main support 12.

Figure 5:
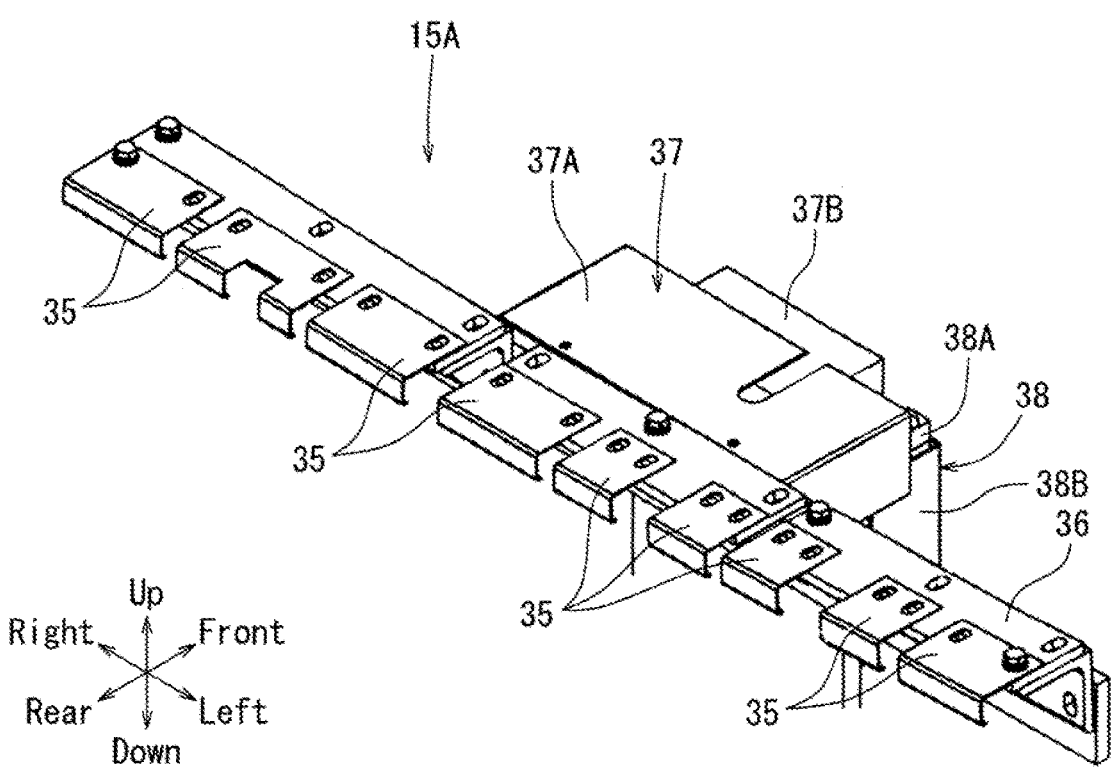
FIG. 5 is a perspective view of a main portion of the pulling device shown in FIG. 1.

As shown in FIG. 5, the claw supporting member 36 may be rectangular in a plan view. The supporting member 36 may have a length substantially equal to the length of the portion of the lip 12A (FIG. 3) of the main support 12 that faces the claw supporting member 36. The edge of the claw supporting member 36 opposite to the main support 12 may extend downward by a length, thereby forming an L-shaped profile. The claw supporting member 36 may be made of sheets of metal, such as aluminum or stainless steel. The edge of the claw supporting member 36 opposite to the main support 12 is attached, generally at the center of its length, to the surface of the outer box part 37A of the pulling mechanism 37 that faces the main support 12.

The pulling mechanism 37 may include a generally box-shaped outer box part 37A having an open side opposite to the main support 12, a generally box-shaped base part 37B inserted in the open side of the outer box part 37A opposite to the main support 12, and a moving mechanism (not shown) housed in the base part 37B. The moving mechanism may be configured to move the outer box 37A relative to the base pan 37B linearly in the insertion direction. The moving mechanism (not shown) in the base part 37B may be configured with at least one of an air cylinder, a pinion gear and a rack, a nut and a ball screw, or the like. The moving mechanism may be powered by compressed air, an electric motor, or any other source, to move the outer box 37A linearly relative to the base part 37B. When the outer box part 37A is moved linearly relative to the base part 37B, the claws 35 on the claw supporting member 36 are moved linearly forward or rearward relative to the main support 12 (in the direction of arrow 41 in FIG. 3).

The vertical movement mechanism 38 may include a generally box-shaped base part 38A connected at a substantially right angle to the lower surface of a portion of the base part 37B of the pulling mechanism 37. The base part 38A may be connected at a position opposite to the claw supporting member 36, thereby forming a generally L-shaped profile. The vertical movement mechanism 38 further includes a generally box-shaped supporting part 38B with an open upper side, in which the base part 38A is inserted. The movement mechanism 38 may also include a moving mechanism (not shown) housed inside the base part 38A. The moving mechanism may be configured to linearly move the base part 38A relative to the supporting part 38B in the insertion direction (i.e. vertically).

The moving mechanism (not shown) in the base part 38A may configured with at least one of an air cylinder, a pinion gear and a rack, a nut and a ball screw, etc., powered by compressed air, motor drive, or other means. The moving mechanism may be configured to move the base part 38A linearly and vertically relative to the supporting part 38B. As shown in FIG. 1, the supporting part 38B of the vertical movement mechanism 38 is bolted or otherwise fixed at a base flange 38C to the mounting base plate 11B. As a result, when the base part 38A moves linearly and vertically relative to the supporting part 38B, the claw supporting member 36 attached to the outer box part 37A, and accordingly the claws 35 on it, is moved linearly and vertically (in the direction of arrow 42 in FIG. 3) relative to the main support 12. This may be done by way of the base part 37B of the pulling mechanism 37.

Referring now to FIGS. 1, 2, 6 and 7, a pair of base member clamping devices 16 for pushing and clamping the base member 3 layered on the surface layer member 2 against the main support 12 will be described. In FIG. 2, two-dot-chain lines indicate the base member clamping devices 16 pushing the base member 3, which is placed on top of the surface layer member 2, into the main support 12.

As shown in FIGS. 1 and 2, the base member clamping devices 16 may be configured substantially symmetrically, and therefore only the base member clamping device 16 on the right side will be described. The base member clamping device 16 may include an air cylinder 45 configured to extend and retract vertically. The base member clamping device 16 may also include a base member pressing device 46 rotatably connected at its rear end to the tip of the air cylinder 45. Accordingly, the base member pressing device 46 may be moved vertically in a pivoting manner as the air cylinder 45 extends and retracts.

Figure 6:
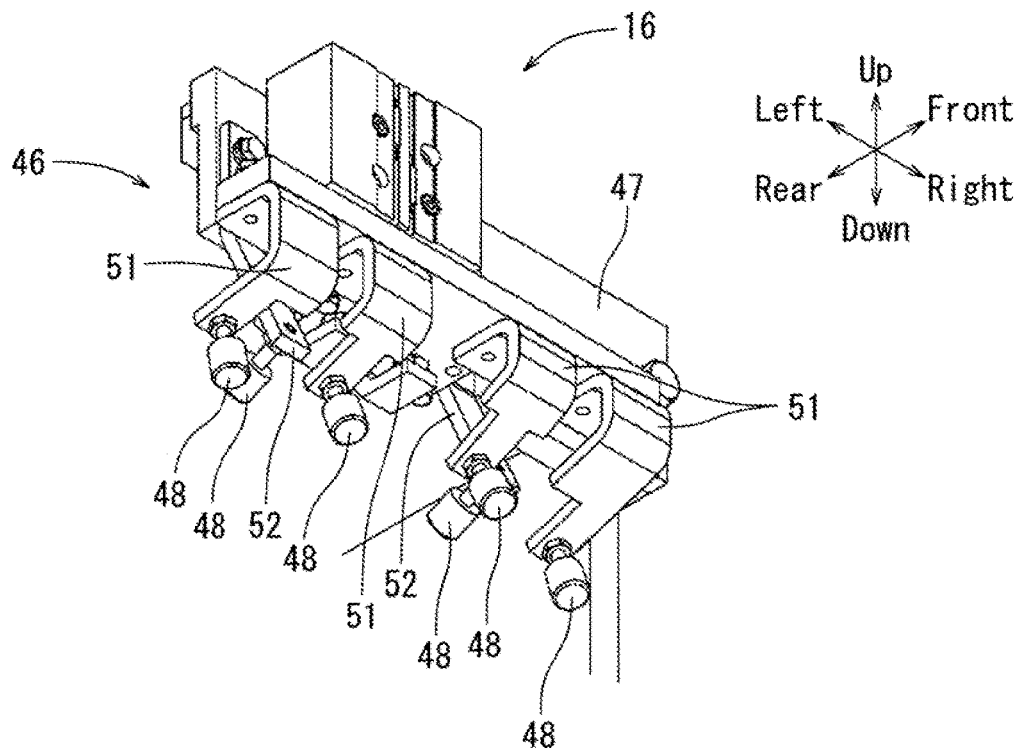
FIG. 6 is a perspective view of a main portion of the base member clamping device shown in FIG. 2.

As shown in FIG. 6, the base member pressing device 46 may include an arm 47 having an L-shape in a plan view. The arm 47 may be configured to be rotated downward when the air cylinder 45 (FIG. 1) extends out. The arm 47 may have a generally L-shaped cross section. The base member pressing device 46 may include a plurality of (e.g. six) contact elements 48 arranged left to right at intervals and mounted on the lower side of the arm 47. The contact elements 48 are configured to contact the inner side surface of the base member 3 and to press the base member 3 downward. Each contact element 48 may be made of elastic rubber and may have a generally columnar shape.

Four support plates 51, each bent into a U-shaped profile, are mounted on the lower surface of the arm 47 and arranged left to right at substantially equal intervals. Four of the six contact elements 48 are attached to the tips of the support plates 51 such that they extend diagonally downward in the forward direction. Two elongated support plates 52 extend downward from of the lower surface of the arm 47 diagonally in the forward direction at the left and right ends of the arm 47. The two remaining contact elements 48 are attached to the tips of the corresponding support plates 52, such that they extend downward diagonally in the rearward direction.

Figure 7:
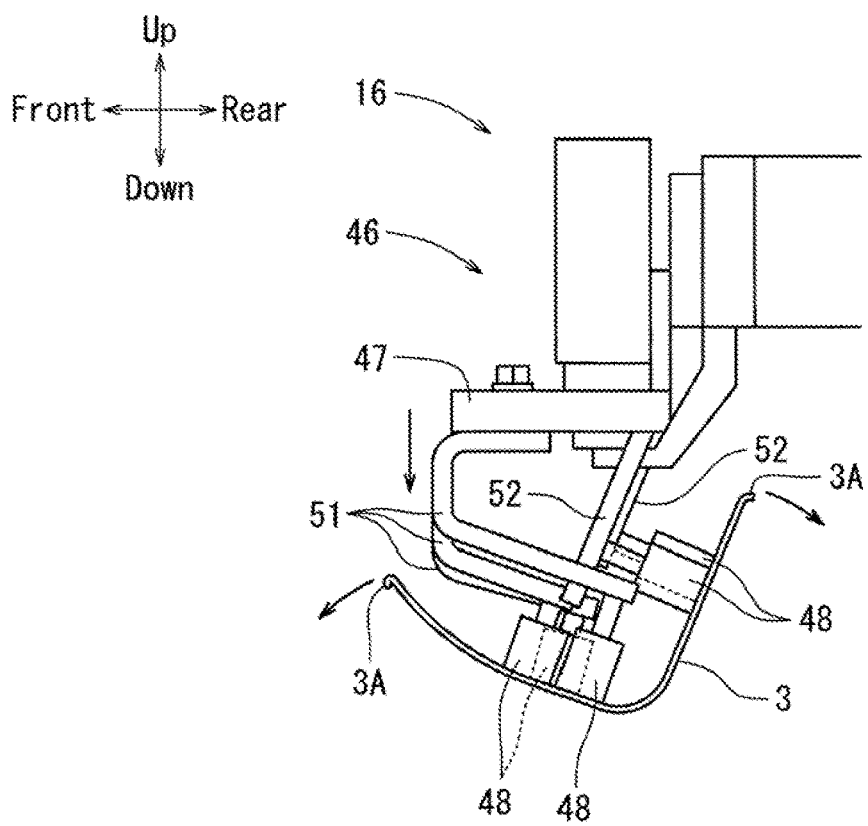
FIG. 7 is a side view of the base member clamping device of FIG. 6 in a pushing position.

Referring to FIG. 7, when the air cylinder 45 (FIG. 1) of the base member clamping device 16 extends out to rotate the base member pressing device 46 downward, some contact elements 48 attached to the U-shaped support plates 51 are brought in contact with an area of the inner side surface of the base member 3 that rises diagonally toward the forward side. These contact elements 48 press down on the base member 3 diagonally forward. At the same time, the other contact elements 48 attached to the support plates 52 are brought in contact with an area of the inner side surface of the base member 3 that rises diagonally toward the rear side. These contact elements 48 press down on the base member 3 diagonally rearward. As a result, the base member 3 is pushed downward. The upward peripheral edges 3A of the base member 3 may be spread more opened such that the base member 3 comes in close contact, at its periphery, with the inner side surface of the surface layer member 2, as will be further described later (see, FIG. 11).

Figure 9:
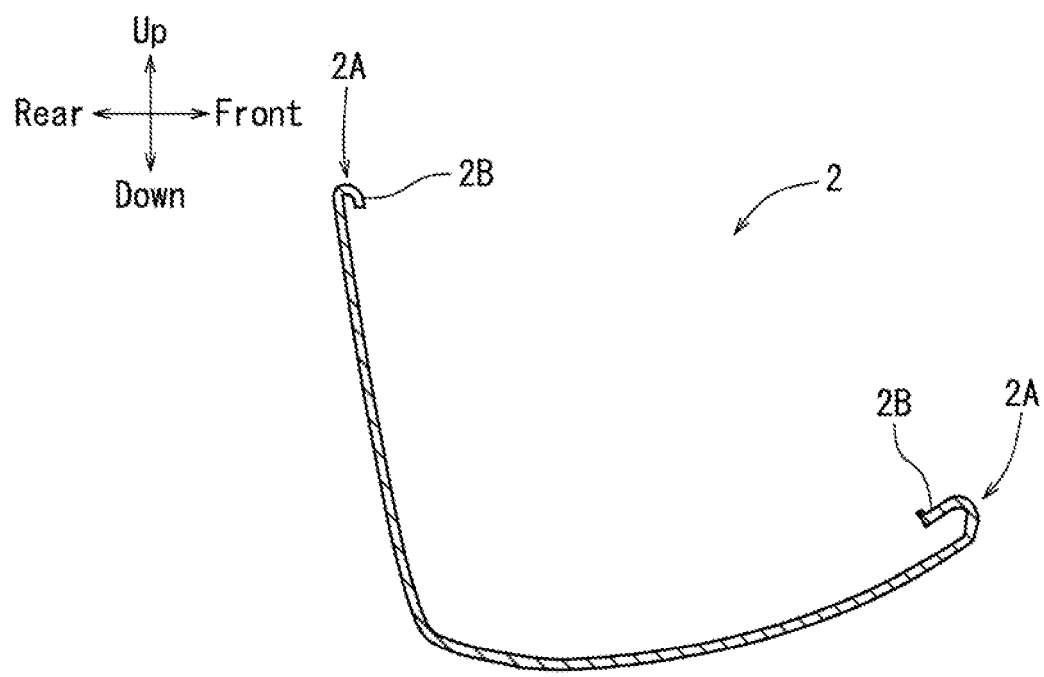
FIG. 9 is a cross-sectional view of the surface layer member of FIG. 8 taken along line IX-IX of FIG. 8.

Referring now to FIGS. 8 and 9, an illustrative surface layer member 2 to be set down in the recess 28 of the main support 12 will be described. As shown, the surface layer member 2 may be a left to right long, generally rectangular sheet formed with a generally U-shaped cross section to be convex on its visual side. With such a shape, it can be set in the recess 28 defined in the upper side of the main support 12. As used herein, the visual side refers to the side of the surface layer member 2 that is visible to the user when the surface layer member 2 is attached to the base member 3. For an armrest (as a surface-layered part) attached to a vehicle door, for example, the visual side is the side of the armrest that faces the inside of the vehicle.

The surface layer member 2 has generally U-shaped wrapping portions 2B on the peripheral edge 2A over its entire circumference. In the embodiment shown in FIG. 8, the wrapping portion 2B has, in the inwardly bent portion of its U-shape, breaks 2C each having a width (e.g., about 3 mm) at appropriate intervals along the periphery. The breaks 2C allow the peripheral edge 2A of the surface layer member 2 to be elastically deformed more smoothly when the wrapping portion 2B is hooked and pulled by the claws 35 of the pulling devices 15A-15F, as will be further described later (see, FIG. 11).

The surface layer member 2 may be made of a relatively soft (or flexible) and stretchable material that is easily elastically deformed when the wrapping portion 2B is hooked and pulled by the claws 35 of the pulling devices 15A-15F. The surface layer member 2 is preferably made of an olefinic elastomer. However, various thermoplastics such as sot polyvinyl chloride or styrenic, olefinic, or polyester materials may be used. Alternatively, other materials, such as elastic woven fabric, non-woven fabric, knitted fabric, synthetic leather, leather, vinyl chloride, and soft film, can be used for the surface layer member 2.

Figure 10:
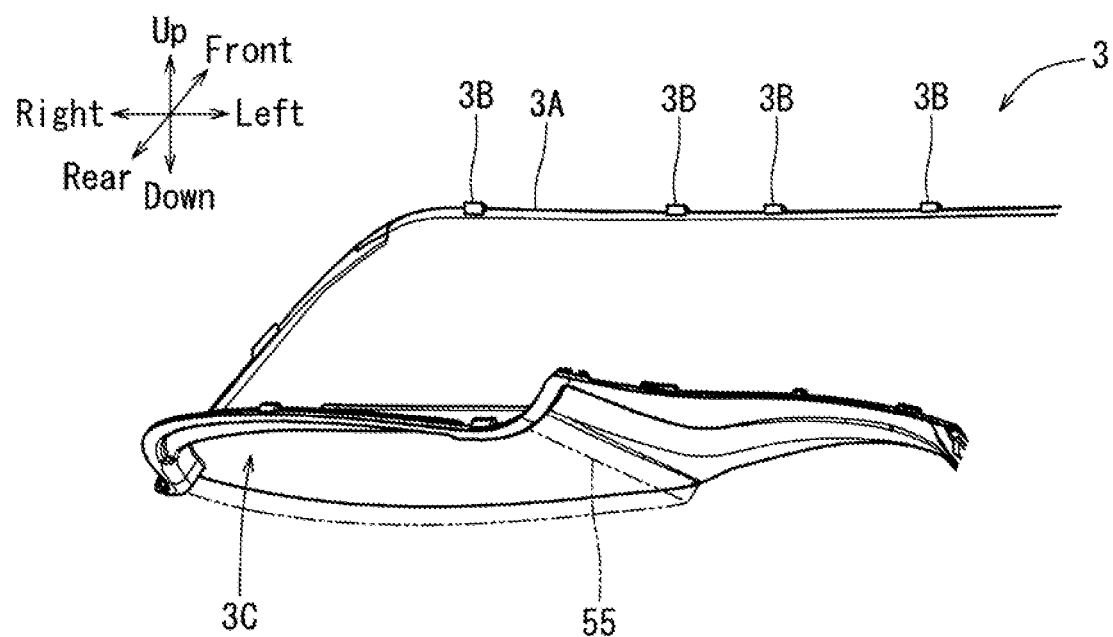
FIG. 10 is a perspective view of an example of a base member.
Figure 13:
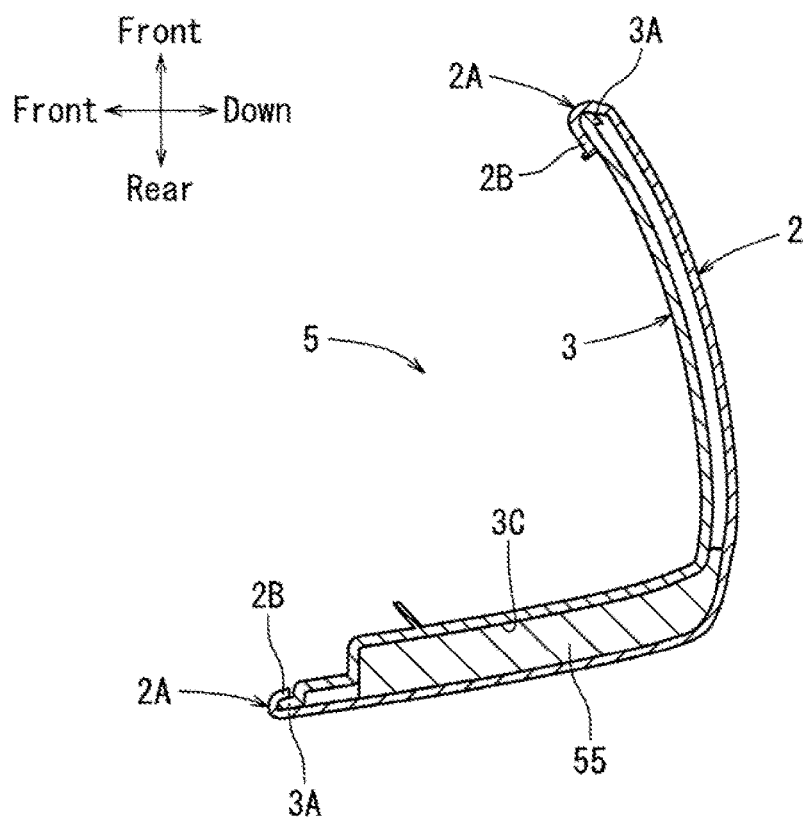
FIG. 13 is a cross-sectional view of the surface-layered part of FIG. 12 taken along line XIII-XIII of FIG. 12.

Referring now to FIG. 10, an illustrative base member 3 to be placed on the non-visual side of the surface layer member 2 will be described. As used herein, the non-visual side refers to the side of the surface layer member 2 opposite to the visual side, i.e. the inner side that is not visible to the user when the surface layer member 2 is attached to the base member 3. As shown in FIG. 10, the base member 3 is a flat member with a left to right long, generally rectangular shape in a plan view. The base member may generally have U-shaped cross section (FIG. 13). The base member 3 may be shaped such that it can be layered on top of the surface layer member 2 that has been set in the recess 28 defined in the upper side of the main support 12.

The peripheral edge 3A of the base member 3 includes tabs 3B, which are configured to be fitted into the breaks 2C defined in the edge 2A of the surface layer member 2. The tabs 3B are attached to the outer side of the base member 3. The protrusion height of the tabs 3B may be substantially equal to the thickness of the surface layer member 2. When the surface layer member 2 is attached to the base member 3 so that the wrapping portions 21 wrap around the peripheral edge 3A of the base member 3, the tabs 3B allow the surface layer member 2 to be positioned in place along the periphery of the base member 3. This also reduces positional deviations along the periphery.

The base member 3 includes, on its outer surface (i.e. the surface toward the surface layer member 2) of the right rear portion, a concave portion 3C having a generally rectangular shape in front view. The concave portion 3C is configured such that a flat cushion member 55 can be attached. Accordingly, the base member 3 will be layered on the non-visual side of the surface layer member 2, with the cushion member 55 attached to the recessed portion 3C therebetween.

The base member 3 may preferably be made of a relatively hard synthetic plastic, and more preferably of any thermoplastic with a higher rigidity than the surface layer member 2. For instance, the base member 3 maybe made of a material such as polypropylene, hard polyvinyl chloride, ABS (acrylonitrile butadiene styrene), or SAN (styrene acrylonitrile). Alternatively, the base member 3 may be a press-formed steel sheet. The cushion member 55 may be made of a synthetic plastic, such as polypropylene or polyurethane, and may have a desired elasticity, that is, a cushioning property of being elastically deformed when pressed. Preferably, polyurethane foam, foam rubber, or the like may be used.

[Manufacturing Method]

Figure 11:
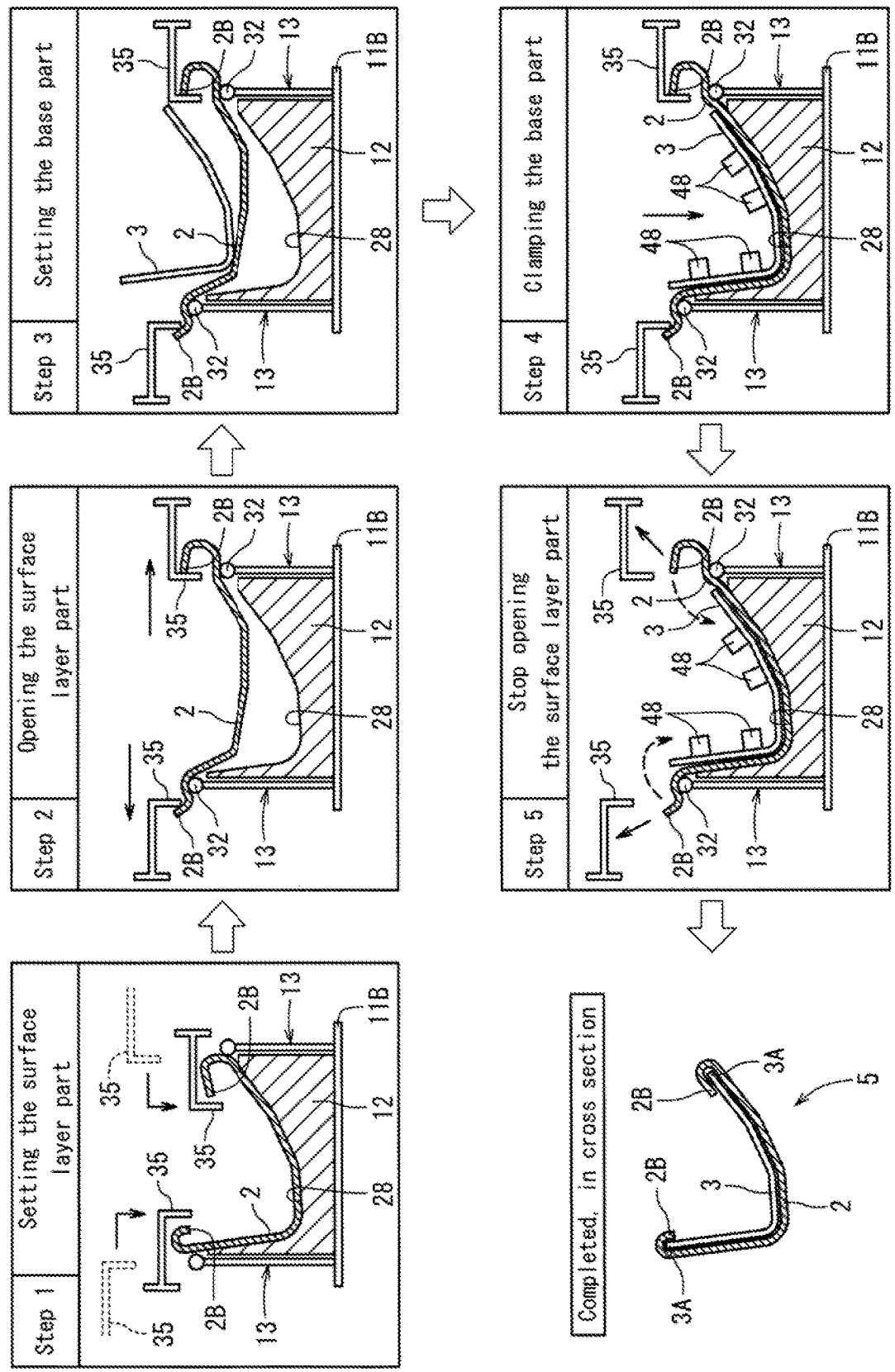
Figure 12:
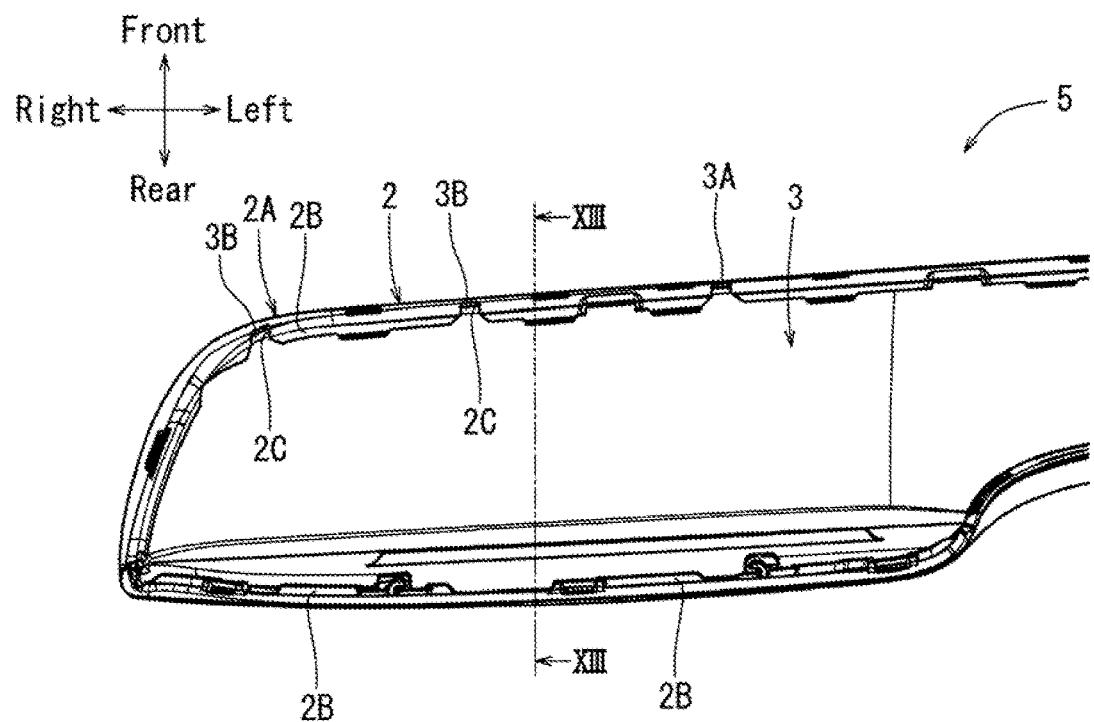
FIG. 12 is a perspective view of an example of a surface-layered part.

Referring now to FIGS. 11 to 13, a method for manufacturing the surface-layered part 5 (FIG. 12) using the manufacturing apparatus 1 configured as described above will be described. As shown in FIG. 11, in Step 1, the worker sets a flat surface layer member 2 down into the recess 28 of the main support 12 of the manufacturing apparatus 1, so that the surface layer member 2 fits in the shape of the recess 28. The surface layer member has a left to right long, generally rectangular shape and a generally U-shaped cross section. The recess 28 of the main support 12 has a left to right long, generally rectangular shape in a plan view. The surface layer member 2 is set such that its visual side faces the bottom surface of the recess 28 in the main support 12.

The worker then presses the start button 25A on the operation box 26 of the manufacturing apparatus 1 to send a start signal to the control device 17. The control device 17, upon receiving the start signal, drives the pulling mechanisms 37 of the pulling devices 15A-15F to move the outer box part 37A substantially horizontally toward the main support 12 to position the claws 35 inside the peripheral edge 2A of the surface layer member 2 in a plan view.

Subsequently, the control device 17 drives the vertical movement mechanisms 38 of the pulling devices 15A-15F to move the base part 37B of the pulling mechanism 37 downward until the inner side of the tip portion of the claws 35 attached to the outer box part 37A reach a position facing the respective wrapping portions 2B of the edge 2A of the surface layer member 2.

In Step 2, the control device 17 drives the pulling mechanisms 37 of the pulling devices 15A-15F to move the outer box part 37A substantially horizontally in the outward direction with respect to the main support 12 by a distance and then stop. During this, the claws 35 hook the respective wrapping portions 2B of the surface layer member 2 and move outward substantially horizontally by a distance. As a result, the surface layer member 2 set in the recess 28 is elastically deformed and lifted from the bottom surface of the recess 28. The peripheral edges 2A along the entire circumference are elastically bent back, while being restrained by the round rails 32 of the peripheral supports 13, to be outwardly opened.

The bending of the peripheral edges 2A of the surface layer member 2 outward over the restraining round rails 32 can prevent the claws 35 of the pulling devices 15A-15F from slipping off from the edges 2A of the surface layer member 2. The outer side surfaces (i.e. visual sides) of the edges 2A of the surface layer member 2 are in contact with the cylindrical surface of the round rails 32. This effectively prevents the surface layer member 2 from being scratched on its visual side, resulting in an improvement to the quality of the product.

In Step 3, after waiting for the pulling mechanisms 37 of the pulling devices 15A-15F to stop pulling the surface layer member 2 outward, the worker sets the flat base member 3 down on the surface layer member 2 in a position that fits to the shape of the surface layer member 2. The base member 3 has a left to right long, generally rectangular shape in a plan view and a generally U-shaped cross section. The worker then presses the clamp operation button 25B on the operation box 26 of the manufacturing apparatus 1 to send a clamp signal to the control device 17. This starts the clamping of the base member 3.

As shown in FIG. 10, the worker may use, for example, a base member 3 with a flat cushion member 55 attached to the concave portion 3C defined in the outer surface of the right rear portion of the base member 3. If so, the worker may set the base member 3 on top of the surface layer member 2 by inserting the right end of the base member 3 into the wrapping portion 2B at the right end of the surface layer member 2. The base member 3 may be inserted such that the cushion member 55 is layered on the inner surface of the right rear portion of the surface layer member 2, as can be seen in FIG. 8. The worker then presses the clamp operation button 25B on the operation box 26 of the manufacturing apparatus 1 to send a clamp signal to the control device 17. This starts the clamping of the base member 3.

As shown in FIG. 11, in Step 4, the control device 17, upon receiving the clamp signal, drives the air cylinder 45 of each base member clamping device 16 to extend out in order to pivot the arm 47 of the base member pressing device 46 downward (see, FIG. 7). This allows the contact elements 48 on the bottom of the arms 47 to press the inner side surface of the base member 3. The contact elements 48 press the base member 3 at areas that extend diagonally upward in the front direction and in the rear direction. Accordingly, the base member 3 is pushed downward so that the upward peripheral edges 3A are spread open outwardly.

As a result, with the surface layer member 2 being pulled outward by the claws 35 of the pulling devices 15A-15F the base member 3 layered on top of the surface layer member 2 and the surface layer member 2 are clamped together between the contact elements 48 of the base member clamping devices 16 pressing the pieces against the main support 12. At the same time, the surface layer member 2, with its periphery still being pulled outward by the claws 35 of the pulling devices 15A-15F, is pushed into the recess 28 of the main support 12, by the base member 3 pushed downward by the contact elements 48. This is done while the surface layer member 2 is being elastically stretched. Furthermore, the base member 3 is clamped by the contact elements 48 such that its upward periphery is in close contact with the inner side surface of the surface layer member 2. The combination of Steps 3 and 4 above may correspond to an embodiment of the third step.

Subsequently, in Step 5, the control device 17 drives the vertical movement mechanism 38 of each of the pulling devices 15A-15F to move the base pan 379 of the pulling mechanism 37 upward and drives the pulling mechanism 37 to move the outer box part 37A further outward with respect to the main support 12 substantially horizontally by a distance. Accordingly, the control device 17 drives the vertical movement mechanism 38 and the pulling mechanism 37 at the same time to take the claws 35 of the pulling devices 15A-15F off from the wrapping portions 28 of the surface layer member 2 in a direction diagonally upward.

As a result, the wrapping portions 2B of the surface layer member 2, the surface layer member 2 still being clamped together with the base member 3 against the recess 28 of the main support 12 by the contact elements 48 of the base member clamping device 16, are further unrolled diagonally upward by the claws 35, and then relaxed. Consequently, as shown in the portion of FIG. 11 labeled "Completed, in cross section," the wrapping portions 2B of the surface layer member 2 are turned back by a strong elastic restoring force over the upward peripheral edge 3A of the base member 3 toward the inside of the recess 28 in the main support 12. Accordingly, the wrapping portions 2B wrap around the peripheral edge 3A of the base member 3 over the entire perimeter to produce a surface-layered part 5 that comprises the base member 3 integrated with the surface layer member 2.

Referring to FIGS. 12 and 13, an example of the surface-layered part 5 thus produced includes the base member 3 with a flat cushion member 55 fitted in the concave portion 3C formed in the rear outer surface of the right end portion of the base member 3. In the surface-layered pan 5, wrapping portions 2B of the surface layer member 2 wrap around the peripheral edge 3A of the base member 3 over the entire perimeter. Further, the surface-layered part 5 includes tabs 3B on the peripheral edge 3A of the base member 3 fitted in the corresponding breaks 2C formed in the edge 2A of the surface layer member 2 that covers from the outside. In the way described above, the manufacturing apparatus 1 produces the surface-layered part 5 in which the surface layer member 2 and the base member 3 are integrated.

Each of the pulling devices 15A-15F is an embodiment of a pulling device and a relieving device. The claw 35 is an embodiment of a pulling member.

As described above in detail, the worker, using the manufacturing apparatus 1 of the present embodiment, sets the surface layer member 2 in the recess 28 of the main support 12 and presses an operation button 25A on the operation box 26. The control device 17 then drives and controls the pulling devices 15A-15F so that the claws 35 hook on the respective wrapping portions 211 of the surface layer member 2. The pulling devices 15A-15F then move outwardly and substantially horizontally by a distance. After that, the worker sets the base member 3 on top of the surface layer member 2 and presses another operation button 25B on the operation box 26. The control device 17 then drives and controls the pulling devices 15A-15F and the base member clamping device 16 in a preset order to produce the surface-layered part 5. The surface-layered part 5 includes the base member 3 integrated with the surface layer member 2.

The manufacturing apparatus 1 can be used to automate the work of hooking the wrapping portions 21 formed in the edge 2A of the surface layer member 2 on the peripheral edge 3A of the base member 3, thereby improving productivity.

[Other Embodiments]

Further embodiments will be described below. The same reference numerals used in the following description as those of the manufacturing apparatus 1 and the surface-layered part 5 of the above embodiments indicate the same or corresponding features to those of the manufacturing apparatus 1 and the surface-layered part 5 of the above embodiments.

(A) In some cases, in Step 5 (which may be the fourth step), the control device 17 may drive only the vertical movement mechanism 38 of each of the pulling devices 15A-15F. This may cause the base part 37B of the pulling mechanism 37 to move upward so that the claws 35 of the pulling devices 15A-15F are separated upward from the wrapping portion 2B of the surface layer member 2.

As a result, each wrapping portion 28 of the surface layer member 2 is relaxed from a stretched state. The surface-layer 2 is clamped together with the base member 3 against the recess 28 of the main support 12 by the contact elements 48 of the base member clamping device 16. The wrapping portions 2B are then flipped back by their elastic restoring force. The wrapping portions 2B are flipped back over the upward peripheral edge 3A of the base member 3 toward the surface layer member 2 (i.e. into the recess 28 of the main support 12). This causes the wrapping portions 2B to hook on the peripheral edge 3A of the base member 3 over its entire circumference. The surface layer member 2 is thus integrated with the base member 3.

(B) in some cases, the surface-layered part 5 may not necessarily include the cushion member 55. For example, a number of elastic protrusions may extend from the non-visual side surface of the surface layer member 2 toward the base member 3. These protrusions function as a cushion to ensure the cushioning property of the surface layer member 2.

A surface layer member 2 with a number of such elastic protrusions on the non-visual side can be used to manufacture a surface-layered part 5. This surface-layered-part 5 includes the surface layer member 2 integrated with the base member 3. The surface-layered part 5 is based on the manufacturing method using the manufacturing apparatus 1 as shown in FIG. 11. The manufacturing apparatus 1 can be used to automate the work of wrapping each wrapping portion 28 formed on the edge 2A of the surface layer member 2 around the peripheral edge 3A of the base member 3, thereby improving productivity.

(C) In some cases, the peripheral support 13 may include, instead of the plurality of round rails 32, a single round rail curved along the periphery of the lip 12A of the main support 12 and welded or otherwise fixed in a substantially horizontal position to the upper ends of the support plates 31. Alternatively, instead of the round rails 32, tubes, square bars, or the like may be welded or otherwise fixed in a substantially horizontal position to the upper ends of the support plates 31.

(D) The claws 35 have been described as having a sideways L-shape. However, they are not limited to a rectangular sideways L-shape, and may instead have an angle slightly larger than a right angle. The claws 35 may have any shape as long as it can hook the generally U-shaped wrapping portion 2B (FIG. 9) formed at an edge 2A (FIG. 8) of the surface layer member 2 and separate from the wrapping portion 2B when moved upward. Alternatively, the claws 35 may have a T-shape or V-shape in a side view. In this case as well, the claws 35 can hook the generally U-shaped wrapping portion 28 (FIG. 9) formed in the edge 2A (FIG. 8) of the surface layer member 2 and can separate from the wrapping portion 2B when moved upward.

(E) In some cases, instead of the sideways L-shaped claws 35 in a side view, a plurality of grabbing devices may be included to grab the generally U-shaped wrapping portion 2B (FIG. 9) formed at the edge 2A (FIG. 8) of the surface layer member 2 by sandwiching it vertically. For example, the grabbing device may include two upper and two lower thin-plate grabbing elements pivotably connected at their base ends. The grabbing elements are normally opened by a coil spring. In the grabbing operation, an electromagnetic solenoid or other actuator is driven (energized) to cause the distal ends to close against the urging force of the coil spring to grab the wrapping portion 2B. The control device 17 may be configured to drive the solenoid actuator. The grabbing device is another embodiment of the pulling member.

In Step 1, the control device 17 drives and controls the pulling mechanism 37 and the vertical movement mechanism 38 of the pulling devices 15A-15F. This causes the grabbing devices to be inserted so that the opened distal ends sandwich the generally U-shaped wrapping portions 2B formed at the edge 2A of the surface layer member 2 (FIG. 8). In Step 2, the control device 17 turns on (energizes) the solenoid actuator of each grabbing device to grip the generally U-shaped wrapping portions 2B. Subsequently, the control device 17 drives the pulling mechanism 37 of each pulling device 15A-15F to move the outer box part 37A substantially horizontally with respect to the main support 12 by a distance and then stop.

Later in Step 5, the control device 17 may turn off (de-energize) the solenoid actuator of each grabbing device to open the distal ends of the grabbing device. As a result, as shown in the portion of FIG. 11 labeled "Completed, in cross section," the wrapping portions 2B of the surface layer member 2 are flipped back over the upward peripheral edge 3A of the base member 3 toward the surface layer member 2 (i.e. into the recess 28 of the main support 12). This is done owing to the strong elastic restoring force of the surface layer member 2. The flipping back of the wrapping portions 2B causes the wrapping portions 2B to wrap around the entire circumference of the peripheral edge 3A of the base member 3. The surface layer member 2 and the base member 3 are thus integrated to produce the surface-layered part 5.

(F) In some cases, instead of the plurality of claws 35 having a sideways L-shape in a side view, a plurality of vacuum suction pads may be included along the edge of the claw supporting member 36 toward the main support 12. The plurality of vacuum suctions pads may be for sucking the generally U-shaped wrapping portion 2B (FIG. 9) formed in the edge 2A (FIG. 8) of the surface layer member 2. For example, each vacuum suction pad may be brought into contact with the wrapping portion 2B. The vacuum suctions pads may suck the wrapping portions to pull the edge 2A of the surface layer member 2. The suction of each vacuum suction pad can be deactivated to separate each vacuum suction pad from the edge 2A of the surface layer member 2. The control device 17 is configured to switch the activation and deactivation of the suction of each vacuum suction pad. The vacuum suction pads are an embodiment of the pulling member.

Then, in Step 1, the control device 17 drives and controls the pulling mechanism 37 and the vertical movement mechanism 38 of the pulling devices 15A-15F. The control device 17 also controls each vacuum suction pad to move to the edge 2A of the surface layer member 2 (FIG. 8). Therefore, the vacuum suction pads are brought into contact with the wrapping portion 2B having a generally U-shaped cross section. Subsequently, in Step 2, the control device 17 activates the suction of each vacuum suction pad to suck the wrapping portion 2B having a generally U-shaped cross section. The control device 17 then drives the pulling mechanism 37 of each pulling device 15A-15F. The outer box part 37A is then moved substantially horizontally with respect to the main support 12 by a distance and stopped.

Later, in Step 5, the control device 17 may deactivate the suction of each vacuum suction pad to cause each vacuum suction pad to separate from the edge 2A of the surface layer member 2. As a result, as shown in the portion of FIG. 11 labeled "Completed, in cross section," the wrapping portions 2B of the surface layer member 2 are flipped back over the upward peripheral edge 3A of the base member 3 toward the surface layer member 2 (i.e. into the recess 28 side of the main support 12). This causes the wrapping portions 21 to wrap the entire circumference of the peripheral edge 3A of the base member 3. The surface layer member 2 and the base member 3 are thus integrated to produce the surface-layered part 5.

(G) The embodiments described above may have the following advantages.

In some embodiments, the worker places the base member and the surface layer member on the main support such that the surface layer member is positioned below the base member. Then the control device drives and controls the pulling device, the base member clamping device, and the relieving device to cause the edge of the surface layer member to wrap around the edge of the base member by means of the elastic restoring force of the surface layer member. Thereby, the surface layer member is integrated with the base member. This allows for automation of the work for wrapping the edge of the surface layer member around the edge of the base member, thereby increasing productivity.

In some embodiments, the surface layer member is fixed, together with the base member, to the main support. The integrated component is bent outward while being restrained by the peripheral support. This effectively prevents the pulling member of the pulling device from separating from the edge of the surface layer member.

In some embodiments, the cylindrical surface of the round rail comes into contact with the outer side surface of the edge bent outward of the surface layer member. This effectively prevents the surface layer member from being scratched and improves its quality.

In some embodiments, the peripheral edge of the base member is clamped to be in close contact with the surface layer member. This allows the edge of the surface layer member to be reliably wrapped around the peripheral edge of the base member, leading to improved product quality.

In some embodiments, the pulling member is shaped so that it allows the edge of the surface layer member to be pulled and detached from the edge of the surface layer member. This allows the pulling member to pull the edge of the surface layer member outward. This also allows the pulling member to separate outwardly from the edge of the surface layer member pulled outward.

While specific embodiments have been described above, it should be understood that the present disclosure is not limited to these embodiments, and various improvements, modifications, additions, and deletions can be made without departing from the spirit of the present disclosure.

What is claimed is:

1. An apparatus for manufacturing a surface-layered part, comprising:

a main support that supports a surface layer member placed under a base member;

a pulling device at a periphery of the main support, wherein the pulling device includes comprises a pulling member that pulls an edge of the surface layer member, the edge of the surface layer member being in a position away from an edge of the base member nearest the edge of the surface layer member, outward with respect to the base member, a pulling mechanism configured to move the pulling member inward and outward with respect to an edge of a lip of the main support, and a vertical movement mechanism configured to move the pulling mechanism vertically;

a base member clamping device that fixedly clamps the surface layer member, after having been pulled outward by the pulling member of the pulling device, against the main support via the base member placed over the surface layer member;

a relieving device that separates the pulling member from the edge of the surface layer member, the edge of the surface layer member having been moved outward with respect to the base member by the pulling device, to allow the edge of the surface layer member to wrap around the edge of the base member owing to an elastic restoring force of the surface layer member, thereby integrating the surface layer member and the base member; and a control device configured to drive and control the base member clamping device, the pulling device, and the relieving device, and the control device is configured to execute instructions stored in memory to drive the vertical movement mechanism to move the pulling mechanism toward the edge of the lip of the support member until the pulling member faces the edge of the surface layer member, then drive the pulling mechanism to move the pulling member in the outward direction with respect to the main support by a distance and pull the surface layer member outward with respect to the base member by hooking the pulling member on the edge of the surface layer member;

drive the vertical movement mechanism to move the pulling mechanism upward away from the edge of the lip of the support member and drive the pulling mechanism to move the pulling member in the outward direction by a distance in a state where the base member clamping device fixes and clamps the surface layer member to the support member via the base member, to pull the edge of the surface layer member in the outward direction further, then release the pulling member from the edge of the surface layer member; and cause the edge of the surface layer member to wrap around the edge of the base member by an elastic restoring force of the surface layer member, and thereby the surface layer member is integrated with the base member.

2. The apparatus of claim 1, further comprising:

a peripheral support along an edge of a lip of the main support, wherein the peripheral support serves as a bending restraint on the surface layer member as the surface layer member is being bent back outward over the peripheral support by the pulling member while being fixed, together with the base member, to the main support by the base member clamping device.

3. The apparatus of claim 2, wherein the peripheral support comprises one or more round rail along the edge of the lip of the main support.

4. The apparatus of claim 1, wherein:
the base member clamping device pushes the base member into the main support so that a peripheral edge of the base member comes in close contact with the surface layer member to thereby clamp the surface layer member.

5. The apparatus of claim 1, wherein:
the pulling member is shaped to hook the edge of the surface layer member outward with respect to an edge of a lid of the support member and to be separated from the edge of the surface layer member away from the edge of the lid of the support member.

6. A method for manufacturing a surface-layered part using the apparatus of claim 1, the method comprising:

first, placing the surface layer member on the main support;

second, pulling the edge of the surface layer member outward with respect to the base member by the pulling member;

third, fixedly clamping the surface layer member against the main support by the base member clamping device via the base member placed over the surface layer member; and fourth, separating the pulling member from the edge of the surface layer member by the relieving device to allow the edge of the surface layer member to wrap around the edge of the base member owing to the elastic restoring force of the surface layer member, thereby integrating the surface layer member and the base member.

* * * * *